(12) United States Patent
Knighton et al.

(10) Patent No.: US 9,619,932 B2
(45) Date of Patent: Apr. 11, 2017

(54) APPLICATIONS WITH INTEGRATED CAPTURE

(75) Inventors: Mark S. Knighton, Santa Monica, CA (US); David S. Agabra, Pacific Palisades, CA (US); Peter J. DeLaurentis, Los Angeles, CA (US); William D. McKinley, Manhattan Beach, CA (US)

(73) Assignee: NEXTPAT LIMITED, Sheung Wan, Hong Kong (HK)

( * ) Notice: Subject to any disclaimer, the term of this patent is extended or adjusted under 35 U.S.C. 154(b) by 272 days.

(21) Appl. No.: 13/275,136

(22) Filed: Oct. 17, 2011

(65) Prior Publication Data

US 2012/0032956 A1 Feb. 9, 2012

Related U.S. Application Data

(62) Division of application No. 12/465,794, filed on May 14, 2009, now Pat. No. 8,049,751, which is a division of application No. 10/911,785, filed on Aug. 3, 2004, now Pat. No. 7,545,373.

(51) Int. Cl.
*G06T 15/00* (2011.01)
*G06T 17/00* (2006.01)
*G06Q 30/06* (2012.01)

(52) U.S. Cl.
CPC .......... *G06T 17/00* (2013.01); *G06Q 30/0601* (2013.01)

(58) Field of Classification Search
USPC .............. 345/419, 420; 235/383; 705/26, 27
See application file for complete search history.

(56) References Cited

U.S. PATENT DOCUMENTS

| 5,630,041 A | 5/1997 | Mills et al. |
| 5,778,177 A | 7/1998 | Azar |
| 5,938,446 A | 8/1999 | Andersson et al. |

(Continued)

FOREIGN PATENT DOCUMENTS

| EP | 0756852 | 2/1997 |
| GB | GB2210707 A | 6/1989 |
| WO | WO-0128249 | 4/2001 |

OTHER PUBLICATIONS http://web.archive.org/web/20040525130145/http://www.prginc.com/Scan&Doc/software/rastercad.htm, (May 25, 2004), p. 2.

(Continued)

*Primary Examiner* — Ahshik Kim
(74) *Attorney, Agent, or Firm* — Blakely Sokoloff Taylor & Zafman LLP

(57) ABSTRACT

Embodiments include a system for integrating capture software functionality into other software applications including computer aided design (CAD) application, search application, database management application, email applications, network publishing applications, collaboration applications, copying and facsimile applications, manufacturing applications and similar programs. A user may utilize any of these applications to initiate a capture of an image or model. The applications may include an integrated capture functionality or message system to communicate with a capture application to initiate a capture. A separate or integrated conversion application may automatically be invoked to convert and return the image or model to the requesting application.

15 Claims, 11 Drawing Sheets

(56) References Cited

U.S. PATENT DOCUMENTS

| | | |
|---|---|---|
| 6,330,523 B1 | 12/2001 | Kacyra et al. |
| 6,592,371 B2 | 7/2003 | Durbin et al. |
| 6,594,539 B1 | 7/2003 | Geng |
| 6,804,568 B1 | 10/2004 | Miyazaki et al. |
| 6,898,477 B2 | 5/2005 | Loughran |
| 6,982,711 B1 | 1/2006 | Takagi |
| 7,024,272 B2 | 4/2006 | Thomas et al. |
| 7,068,268 B2 | 6/2006 | Kubota et al. |
| 7,123,985 B2 | 10/2006 | Wildsmith et al. |
| 7,352,882 B2 * | 4/2008 | Wolf .............................. 382/103 |
| 7,730,406 B2 * | 6/2010 | Chen ............................ 715/723 |
| 2002/0048040 A1 | 4/2002 | Kato |
| 2002/0095236 A1 | 7/2002 | Dundorf |
| 2002/0137011 A1 | 9/2002 | Shoher et al. |
| 2004/0029068 A1 | 2/2004 | Sachdeva et al. |
| 2004/0153824 A1 | 8/2004 | Devarajan et al. |
| 2005/0024360 A1 | 2/2005 | Abe et al. |
| 2005/0080502 A1 * | 4/2005 | Chernyak et al. .............. 700/97 |

OTHER PUBLICATIONS

PCT International Search Report, International Application No. PCT/US05/27459, International Filing Date Aug. 2, 2005, 14 pgs.

Non-Final Office Action dated Apr. 23, 2007, U.S. Appl. No. 10/911,785, filed Aug. 3, 2004, whole document.

Final Office Action dated Oct. 9, 2007, U.S. Appl. No. 10/911,785, filed Aug. 3, 2004, whole document.

Non-Final Office Action dated Aug. 6, 2008, U.S. Appl. No. 10/911,785, filed Aug. 3, 2004, whole document.

Supplementary European Search Report, Application No. 05782543.2, completed May 16, 2008, mailed May 27, 2008, 3 pgs.

D.E.A. Digital Electronic Auto, "Interactive Graphics System for the Mathematical Representation of Physical Models", UK Patent Application, GB2210707A, Application No. 8823532.0, filed Oct. 6, 1988, D.E.A. Digital Electronic Automation S.p.A., 38 pgs.

Nextengine, Inc., Non Final Office Action mailed Oct. 21, 2010; U.S. Appl. No. 12/465,794.

Nextengine, Inc., Final Office Action mailed Apr. 14, 2011; U.S. Appl. No. 12/465,794.

* cited by examiner

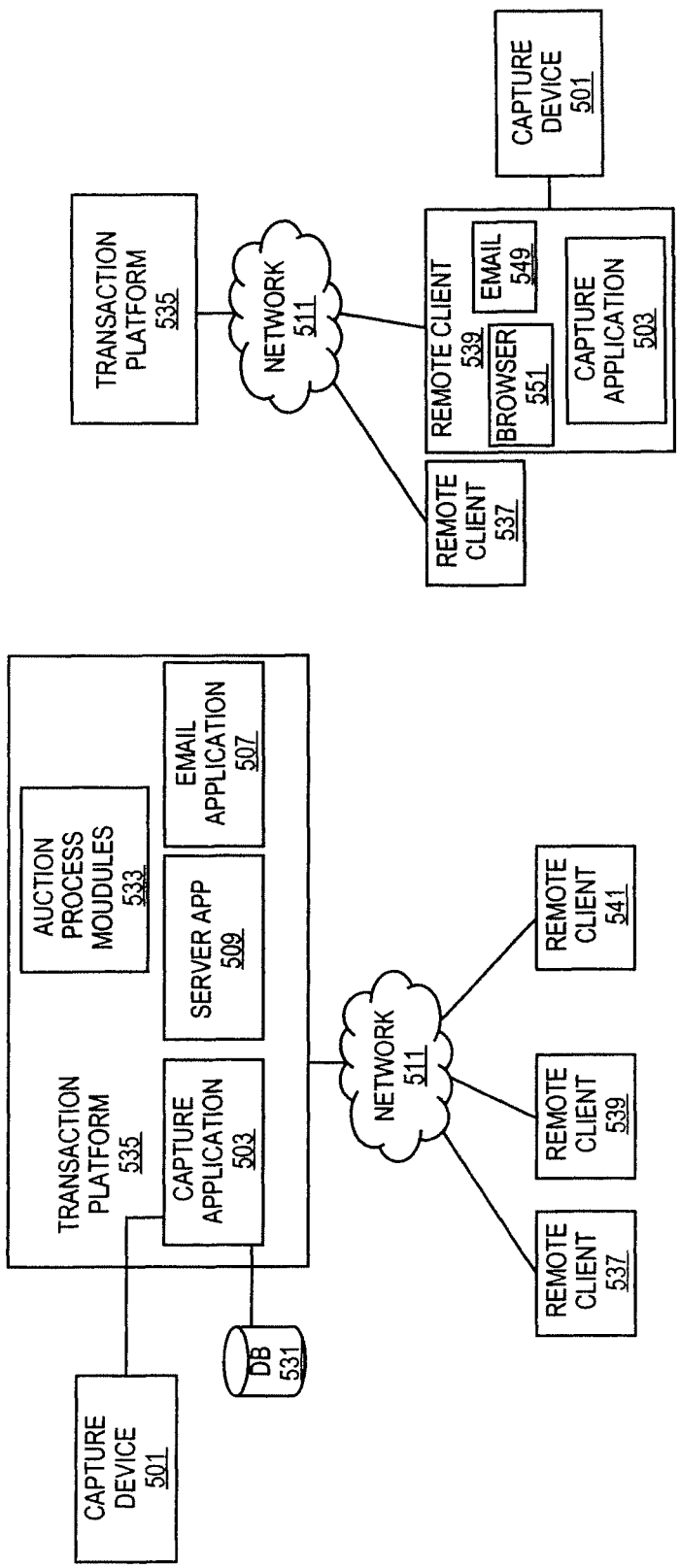

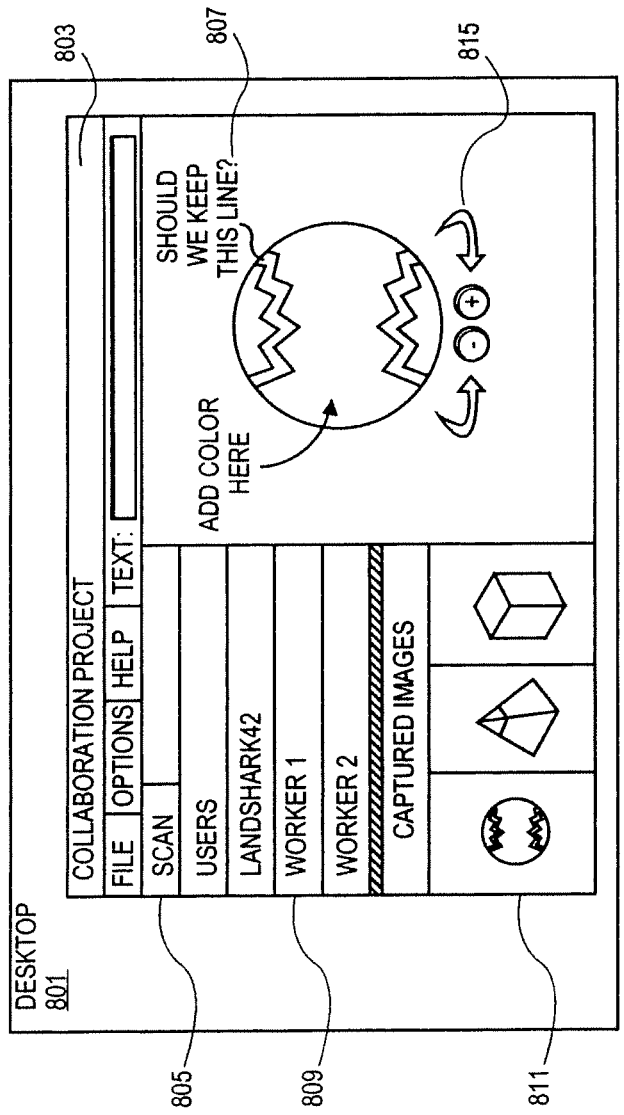
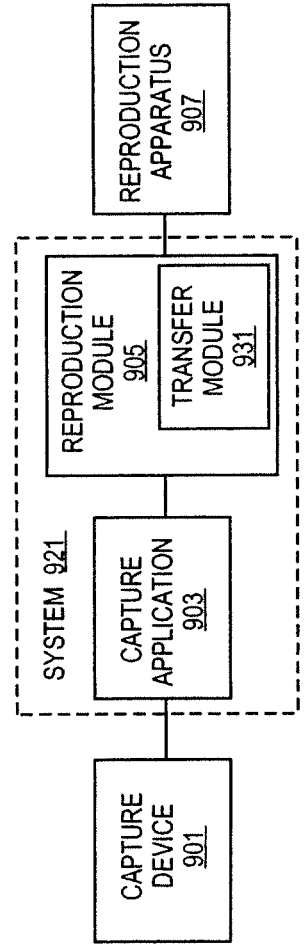
FIG. 8
FIG. 9

APPLICATIONS WITH INTEGRATED CAPTURE

CROSS-REFERENCE TO RELATED APPLICATIONS

This patent application is a divisional of U.S. patent application Ser. No. 12/465,794, filed May 14, 2009 which is a divisional of U.S. patent application Ser. No. 10/911,785, filed Aug. 3, 2004, issued as U.S. Pat. No. 7,545,373 on Jun. 9, 2009 and entitled APPLICATIONS WITH INTEGRATED CAPTURE.

BACKGROUND

Field of the Invention

The embodiments of the invention relate to integrating capture devices and software with other related applications. Specifically, the embodiments of the invention are related to providing the ability to initiate a capture and import the captured data into integrated applications.

Background

A capture application is used to operate a scanning or capture device such as a digital camera or scanner and store a captured image. This application is independent and stands alone from other software. The scanning and capture application stores the captured data in a format native to the scanning or capture application. If a user desires to import data generated by the scanning or capture application that separate target application must be opened and the data converted into a format recognized by the target application before being opened by the target application. The captured data is either three dimensional data or two dimensional data.

Computer automated design (CAD) applications are possible target applications. These applications create and manipulate three dimensional models. These models may be stored on local storage devices. The CAD application can operate on three dimensional models or data generated or captured by other applications if the three dimensional models or data are converted into the format utilized by the CAD application. A separate conversion application is utilized to alter the format of the three dimensional models. A user seeking to import a three dimensional object into the CAD application opens three separate applications: the generating application, the conversion application and the CAD application to affect this transfer.

Similar actions are used to allow two dimensional images to be utilized by applications including databases, email applications, publishing applications and similar programs when the two dimensional image is generated by another application. An application to generate or capture a two dimensional image is used and the image stored. A conversion program is used to alter the format of the image for use with other applications. The target application is then used to open the converted images. Again, three separate applications are required to generate or capture an image and then convert it into a format that a target application can handle. Each separate application must be individually launched and manipulated by a user to affect the desired capture and import.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 5B is a diagram of one embodiment of an integrated system for capturing and publishing a three dimensional representation of an object through a transaction platform.

FIG. 5C is a diagram of one embodiment of an integrated system for capturing and publishing a three dimensional representation of an object through a transaction platform.

FIG. 8 is a diagram of one embodiment of a user interface of the integrated collaboration application.

FIG. 9 is a diagram of one embodiment of an integrated system for capturing and reproducing a three-dimensional object.

DETAILED DESCRIPTION

Figure 1A:
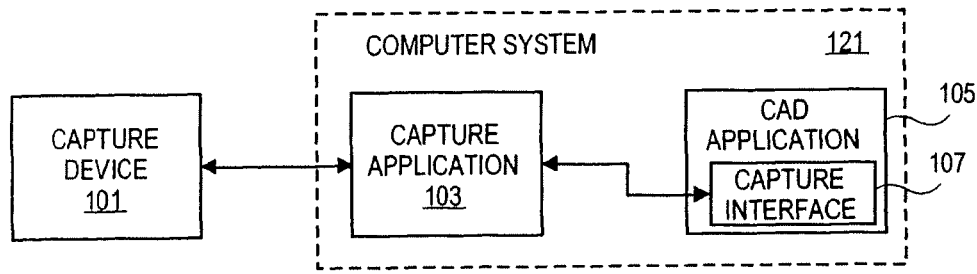
FIG. 1A is a diagram of one embodiment of an integrated system for capturing a three dimensional representation for use with a computer aided design (CAD) application.

FIG. 1A is one embodiment of an integrated computer aided design (CAD) module and capture module. In the embodiments discussed herein, the CAD module and capture module are in the form of applications for purpose of convenience. One of ordinary skill would understand other module types would also be appropriate. In one embodiment, the integrated CAD system may be in communication with a capture device (e.g., 'capture unit') 101 or similar device. Capture device 101 may be a handheld scanner, fixed scanner, digital camera, copy machine or similar device capable of capturing a two dimensional image or three dimensional representation of an object or "model." In one embodiment, the two dimensional image may be an image of the surface of an object such as an image of an object captured and modeled in three dimensions. Such a surface image is sometimes referred to as a texture map.

In one embodiment, the capture device 101 may be in communication with computer system 121 and integrated capture application 103 through a distributed network such as the Internet or a local area network (LAN), universal serial bus (USB) port, FireWire, Bluetooth, or similar connection or wireless communication system. In one embodiment, capture device 101 may be controlled by capture application 103. Capture application 103 may be resident on a general purpose computer system 121 or specialized system in communication with the capture device 101.

In another embodiment, the capture application 103 may be primarily resident within capture device 101. The components of the integrated capture system may be distributed over multiple components. The capture application 103 on the device may communicate with the integrated system through a client, plug-in application or similar program to provide the needed accessibility. In one embodiment, the capture application 103 may manage the operation of the capture device 101 including the generation and storage of an image or three dimensional model captured by the capture device.

In one embodiment, a CAD application 105 may be present on computer system 121 or in communication with computer system 121. The CAD application 105 may be used to design objects. Designs may take the form of a three dimensional visual representation of objects. CAD applications may include AutoCAD by Autodesk, Inc. or similar CAD applications that work with two dimensional images or three dimensional object models. The CAD may also be a multimedia application such as Maya 3D by Alias Systems Corporation or similar multimedia tools that work with two dimensional images or three dimensional models of objects.

In one embodiment, the CAD application 105 may include or may be updated to include a capture application user interface 107. The interface 107 component may allow the CAD application 105 to communicate with the capture application 103 and offer its functionality to the user of the CAD 105. The capture interface 107 may allow a user of a CAD application 105 to initiate a capture and to import the resulting captured data into the CAD application 105 in a format utilized by the CAD application 105. This allows the user to manipulate and alter the data captured by using the standard tools of the CAD application 105 without needing to open separate applications to capture and import the data. In one embodiment, the capture interface 107 may be provided by a plug-in component or similar modular component. The capture interface 107 may include a user interface that is integrated into the CAD application user interface or a separate user interface such as a separate window interface.

Figure 1B:
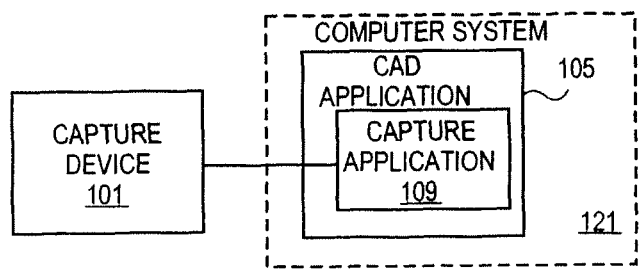
FIG. 1B is a diagram of one embodiment of a wholly integrated system for capturing a three dimensional representation for use with a CAD application.

FIG. 1B is another embodiment of the integrated CAD and capture application system. In this embodiment, the capture device 101 may be in direct communication with the CAD application 105. The capture application 109 may be wholly integrated into the CAD application 105. The capture application 109 may be an update to a basic CAD application 105 or similar modification of a CAD application 105. CAD application 105 may be designed to include the capture application 109 functionality to manage the capture device 101. The capture application 109 functionality may be accessible through the standard tools and user interfaces of the CAD application 105.

In one embodiment, the CAD application 105 may be executed by a computer system 121. The capture device 101 may be in communication with the computer system 121 and integrated capture application 109 through a distributed network, universal serial bus (USB) port, FireWire, Bluetooth or similar connection or wireless communication system.

Figure 1C:
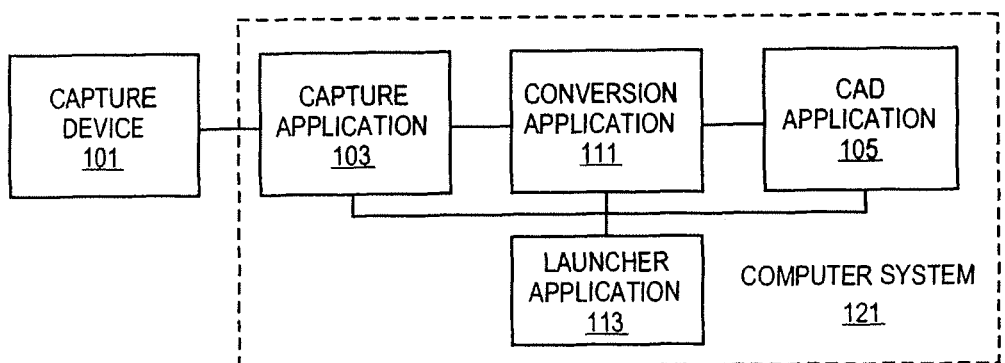
FIG. 1C is a diagram of one embodiment of an integrated system for capturing a three dimensional representation for use with a CAD application including a conversion application.

FIG. 1C is a further embodiment of the integrated CAD and capture software system. In this embodiment, a capture device 101 may be controlled by an independent capture application 103 on computer system 121 or similar system. A CAD application 105, conversion application 111 and launcher application 113 may also be available on computer system 121 or similar system.

In one embodiment, the CAD application 105 may not be capable of utilizing the images and three dimensional models generated by the capture application 103. A conversion application 111 may be present to allow the images and three dimensional models captured and stored by the capture application 103 to be converted into images and three dimensional models accessible and modifiable by CAD application 105. In one embodiment, the capture application 103 may receive image and model data from capture device 101 and store the data in the form of a point cloud or polygonal mesh or similar data structure. The CAD application 105 may operate on a parametric data type such as an Initial Graphics Exchange Specification (IGES) format, Non-Uniform Rational B Spline (NURBS) format or similar formats. Conversion application 111 may convert the data in the first data type into data of the second data type. Conversion application 111 may be automatically invoked along with the capture application 103 to automatically facilitate the retrieval of the captured data and return of this data to the CAD application 105 for use by the user. This automated process of conversion and importation may be initiated and managed by a user entirely through the user interface of the CAD application 105, a separate user interface provided by a launcher application or similar application or through a similar interface system. Further description of processing the integrated capture is discussed in relation with FIG. 10 below.

In another embodiment, the integrated system may include a launcher application 113. Launcher application 113 may provide a wrapper program to allow a user to initiate each of the other programs such that each is ready or assisted in facilitating the other applications in the process of importing captured data into the CAD application 105 at the request of a user. The launcher application 113 may provide a user interface to allow the user to manage each of the other applications through one central interface for the user.

The preceding embodiments are illustrative examples of the integrated CAD application and capture system. Permutations of these exemplary systems may also be used where each component or configuration in one example embodiment may be used with components and configurations of other example embodiments. For example, a launcher application may be used in combination with the example embodiments of FIGS. 1A and 1B. Other combinations and variations may be utilized along a spectrum of autonomous coordination between the components and complete integration of the components.

Figure 2:
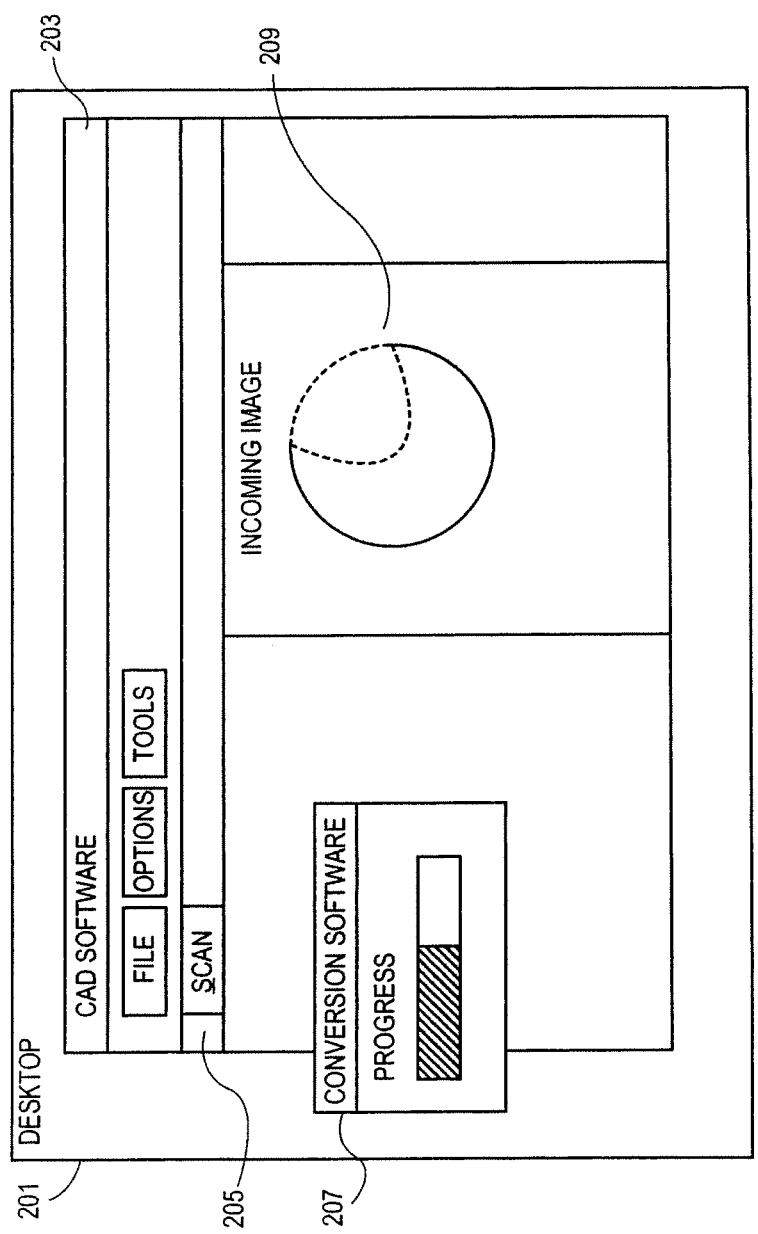
FIG. 2 is a diagram of one embodiment of a user interface of the integrated application.

FIG. 2 is a diagram of an example user interface for one embodiment of the integrated capture and CAD application system. In one embodiment, the integrated system may be used in the context of a standard operating system environment 201. The operating system may be Microsoft Windows, OS X by Apple Computers or similar operating system environment. The operating system environment may be a windowing environment or similar user interface.

In another embodiment, the system may be initiated from a command line or similar environment and generate its own graphical user interface.

In one embodiment, the CAD application may function in a discrete window 203 where each of its tools are available to a user and an interface 205 to the capture application may be present. The CAD application may also include a display area 209 to display the current object or design being worked on. In one embodiment, the capture interface 205 may be part of a toolbar, drop down menu or similar interface. The capture interface may provide a user options including initiating a capture, importing data, exporting data and similar options.

In one embodiment, if a capture function is initiated an indicator such as a pop up window or a window of the capture application may be displayed to demonstrate to a user that the capture is in progress or to specify settings for the capture process. The integrated system may also provide an indicator 207 for a conversion process if necessary to allow a user to track the progress of the capture and conversion into a format useable by the CAD application. In one embodiment, the CAD application may also display the progress of the capture through a display window 209 or by a similar means. The display window may display the received image or three dimensional model data as it is received or at the time of completion.

In other embodiments, any type of user interface including any type of graphical user interface (GUI) may be used to allow a user to access the functionality of the capture software through a launcher program or CAD application. In another embodiment, the capture application may integrate aspects of the CAD application to facilitate the export of the captured data to a CAD application. The integrated system may be designed to streamline the process of generating products, designs and multimedia generally generated by use of a CAD application by automating the process of initiating and controlling a capture process and importing the captured data into the CAD application such that the captured data may be manipulated using the tools of the CAD application.

Figure 3A:
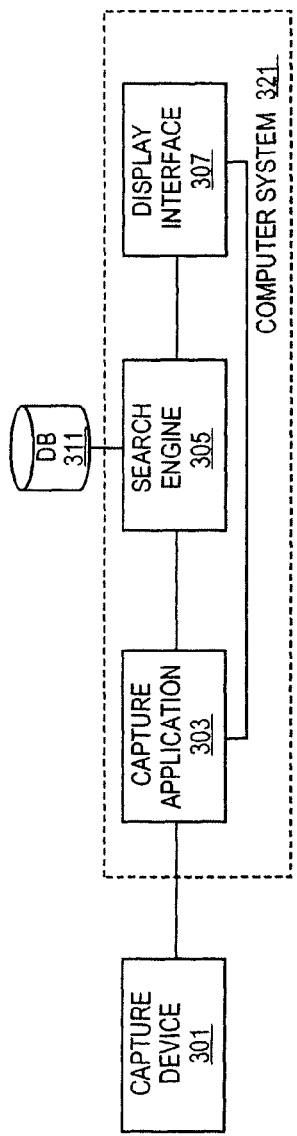
FIG. 3A is a diagram of one embodiment of an integrated system for capturing a three dimensional representation for use with a search engine.

FIG. 3A is a diagram of one embodiment of an integrated search module and capture system. In the embodiments discussed herein the search module is a search engine for the sake of convenience. One of ordinary skill would understand that other search modules may be used. In one embodiment, the integrated system is in communication with a capture device 301. The capture device 301 may be a scanning device, digital camera or similar capture device. The integrated system may operate on a general computer system 321, specialized system or similar apparatus. The integrated system may include a capture application 303, search engine 305, display interface 307, database 311 or similar components. The components of the integrated capture system may be distributed over multiple computers. The capture device may be local or remote from the system and in communication with the system via a distributed network connection, USB connection, FireWire connection or similar connection.

In one embodiment, the capture application 303 may provide control over the operation of the capture device 301 including the initiation of the capture of an image or digital model of an object as well as the storage of the captured image or model. The capture application 303 may be in communication with a search engine 305. The search engine 305 may be able to receive the input of the capture device in the form of an image or three dimensional model. The input from the capture device may be automatic or provided at the initiation of the user. In one embodiment, an automatic input of the captured data may include automatically saving the captured data, converting the format of the captured data to a format native to the search engine and passing control of the captured data to the search engine. In another embodiment, a conversion may not be necessary because the capture application stores the captured data in a format accessible to the search engine. Passing control to the search engine may be accomplished through shared memory space, passing a location of the stored data, use of a socket or similar communication mechanism or similar method commonly used to share between applications or pass data from one application another application.

The search engine may search a database 311 for items that match the captured data. A match may be sought for the image or the three dimensional model based on similarities in the dimensions, coloration, object type and similar characteristics or data derived from the captured image or three dimensional model. For example, derived data for three dimensional models may include wavelet data, spectral data and similar data derived from captured data. In one embodiment, a model of a complementary object may be derived from the model of the object captured. For example, a model of a bolt may be derived from the model of the corresponding nut. Additional models of a portion or a subcomponent of the object captured may be derived from the captured data. In one embodiment, the search criteria are specified by the captured data or information derived from the captured data. In one embodiment, the search may be performed on a database that refers to data stored at different sites accessible over a distributed network. For example, a local database may contain links to source data that resides on other nodes or the Internet.

In one embodiment, the database 311 may be a local database to the computer system or a remote database. The database 311 may be a flat file, object-oriented database, relational database or similar database. The database 311 may store data related to any type of image or three dimensional model, data related to the image or model or information derived from the image or model. Images and models may be stored and manipulated as data records in the database. In one embodiment, data stored in database 311 may be data 'related' to a two dimensional image or three dimensional model. 'Related' data may be data related to the depicted object in an image or model, such as a web page, files or similar resources. Related data may include text, documentation, e.g., brochures or data sheets related to a depicted object, other images, keywords, maps, symbols and similar information related to the location, identity, content, operation or similar aspects of an image or model, or object depicted on an image or model. Related data may also include models of subcomponent, e.g., a turbine has a blade, or complementary parts, e.g., a bolt has a related (complementary) nut. In one embodiment, links to the locations on a distributed network of the two dimensional images and three dimensional models are stored in the database.

In one embodiment, a user may interact with the search engine and receive results from the search engine through a display interface 307. The display interface 307 may be a dedicated display application for use with the integrated search engine. In another embodiment, the display interface 307 may be a general display interface such as a browser application. In one embodiment, the display interface may also provide access to capture application functionality and related services.

Figure 3B:
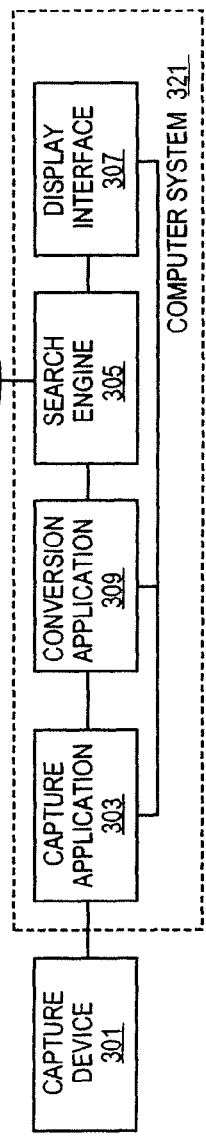
FIG. 3B is a diagram of one embodiment of an integrated system for capturing a three dimensional representation for use with a search engine using a conversion application.
Figure 3C:
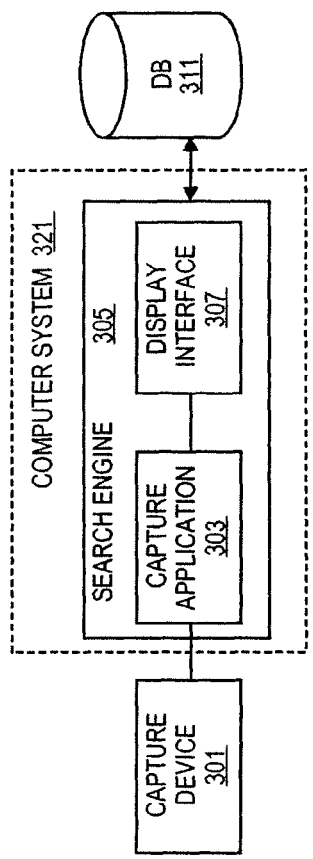
FIG. 3C is a diagram of one embodiment of a tightly integrated system for capturing a three dimensional representation for use with a search engine.
Figure 3D:
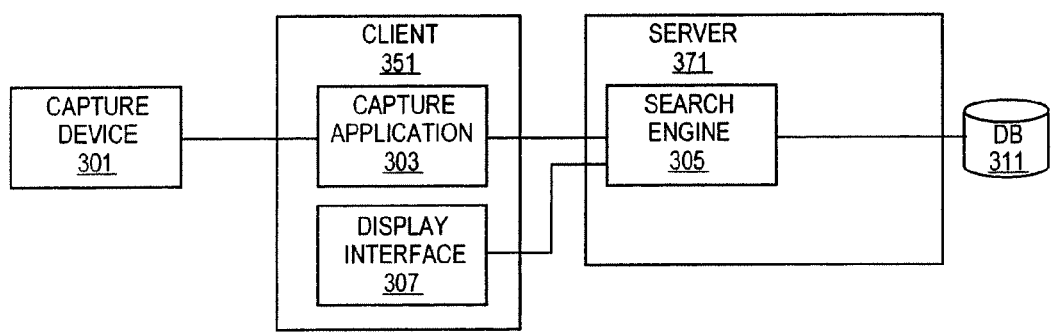
FIG. 3D is a diagram of one embodiment where the captured application is remote from the search engine.

FIGS. 3B, 3C and 3D are diagrams of example variant embodiments of the integrated search engine and capture system. FIG. 3B is a diagram of an embodiment of the integrated capture and search engine system where a conversion application is present. In this embodiment, the capture application 303 may not generate an image, three dimensional model or data derived from the capture in a format that the search engine 305 is capable of utilizing. The conversion application 309 may convert the data from the capture application 303 into data in a format accessible to the search engine 305. This process may also be initiated by a user through the display interface and search engine 305 or may be automated with the initiation of the capture process.

FIG. 3C is a diagram of one embodiment where the capture application may be tightly integrated into the search engine. In this embodiment, the capture application 303 may be a component of the search engine application 305. The capture application 303 may generate images and three dimensional models from data received from the capture device in a format native to the search engine. In one embodiment, the search engine may provide access to the functionality of the capture application 303 and the input of the capture device through an integrated display interface 307.

FIG. 3D is a diagram of one embodiment where the capture application is remote from the search engine. In one embodiment, the capture application may be located on a client machine 351. The capture device 301 may be local to the client machine 351 and in communication with the capture application 303. In one embodiment, the display interface 307 may be present on client machine 351. In another embodiment, the display interface 307 may be present on the server machine 371 or may have separate instances on both machines. The capture application 303 may communicate with search engine 305 via hypertext transport protocol (http) or similar communication system. The search engine 305 may receive input from the capture application 303 and search database 311. Search results may be returned to the client 351 to be displayed via the display interface 307.

The preceding embodiments are illustrative examples of the integrated capture and search system. Permutations of these exemplary systems may also be used where each component or configuration in one example embodiment may be used with components and configurations of other example embodiments. For example, a launcher application may be used in combination with the example embodiments of FIGS. 3A and 3C. Other combinations and variations may be utilized along a spectrum of autonomous coordination between the components and complete integration of the components.

Figure 4:
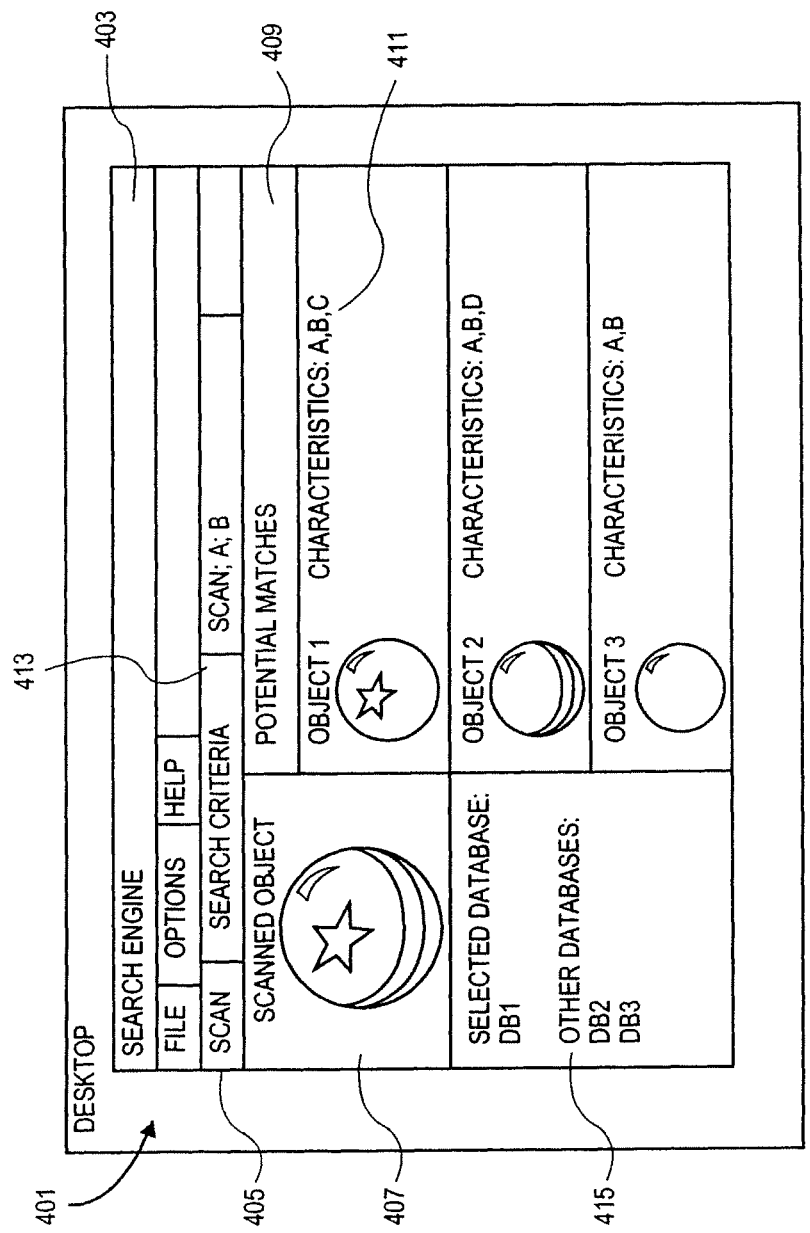
FIG. 4 is a diagram of one embodiment of a user interface of the integrated search application.

FIG. 4 is a diagram of one embodiment of a user interface for the integrated search and capture system. In one embodiment, the integrated system may be used in the context of a standard operating system environment 401. The operating system may be Microsoft Windows, OS X by Apple Computers or similar operating system environment. The operating system environment may be a windowing environment or similar user interface. In another embodiment, the system may be initiated from a command line interface or similar environment and generate its own graphical use interface.

In one embodiment, the integrated application may function in a discrete window 403 where each of its options, input interface and results display are available to a user and an interface 405 to the capture application may be present. In one embodiment, the user interface may be a browser application providing access to the search engine. In one embodiment, the capture interface 405 may be part of a toolbar, drop down menu or similar interface. The capture interface may provide a user options including initiating a capture, importing data, exporting data and similar options.

In one embodiment, the user interface may provide an input field 413 where a user may specify the search terms including the use of captured data. The input field may be a text field, menu or similar interface mechanism. The capture interface 405 may be used to input or initiate the input of the captured data. The user interface may include a window 407 or similar display to show the captured data. The user interface may also display other current settings and parameters for the search such as the current database to be searched or similar data. Captured data may be displayed as a thumbnail in a two dimensional form or a rotating three dimensional form or similar display format.

In one embodiment, if a capture function is initiated an indicator such as a pop up window or a window of the capture software may be displayed to demonstrate to a user that the capture is in progress or to specify settings for the capture process. The integrated system may also provide an indicator for a conversion process if necessary to allow a user to track the progress of the capture and conversion into a format useable by the search application. In one embodiment, the progress of the capture may be displayed through a window 407 or by a similar mechanism. The display window may display the received image or three dimensional model as it is received or at the time of completion.

In one embodiment, after the captured input has been received and the search based on the selected search parameters begins, search results may be displayed in a results window 409 or similar display mechanism. The displayed results may be a set of data 411 related to an object or image found in the database or may be data derived from the captured or returned image or model. An image or three dimensional model may be displayed, characteristics of the object or derived model data may be displayed or similar related data may be displayed. Further, details of the integrated capture process are discussed below in relation to FIG. 10.

In other embodiments, any type of user interface including any type of graphical user interface (GUI) may be used to allow a user to access the functionality of the capture software through a browser, dedicated search engine interface, launcher application or similar program. In another embodiment, the capture application may integrate aspects of the search engine to facilitate the export of the captured data to the search engine. The search engine interface may be integrated with the capture application and search results may be displayed through the capture application. The integrated system may be designed to streamline the process of searching through stored objects, products and multimedia by automating the process of initiating and controlling a capture process and importing the captured data into the search engine such that the captured data or data derived from the captured data may be used by the search engine to search a database.

Figure 5A:
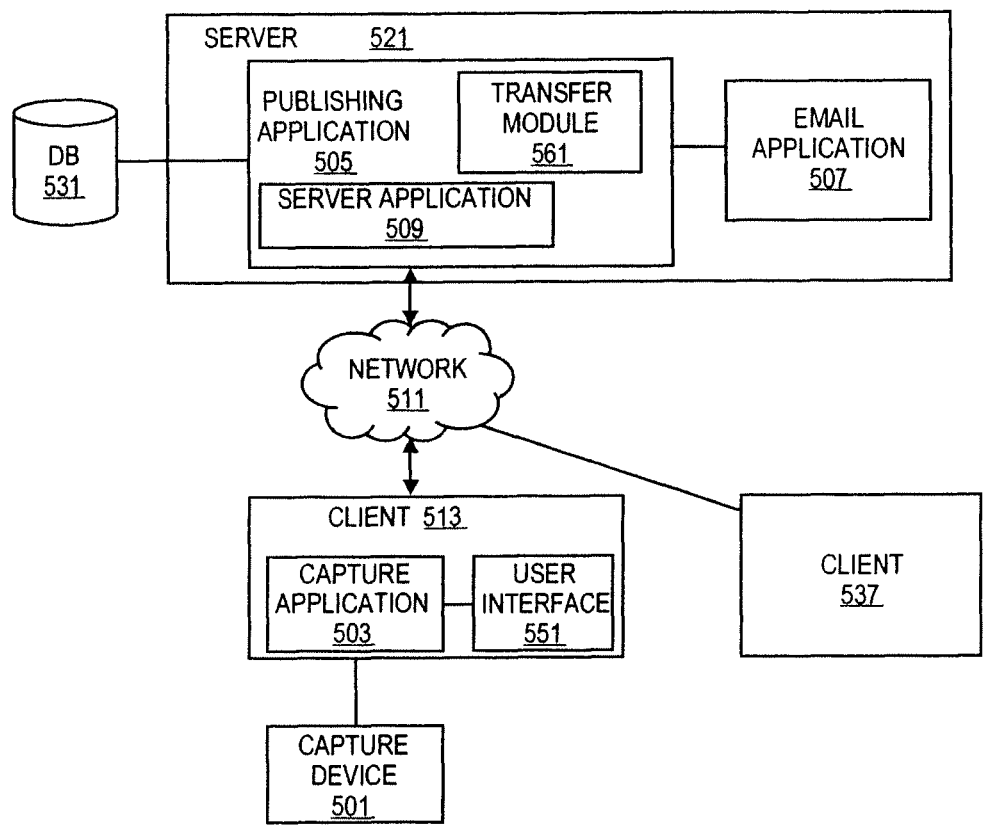
FIG. 5A is a diagram of one embodiment of an integrated system for capturing and publishing a three dimensional representation of an object.

FIGS. 5A-5C are diagrams of example embodiments of an integrated capture and publishing system. FIG. 5A is a diagram of one embodiment of the integrated capture and publishing system. The capture and publishing system may be designed to facilitate the capture of an image or three dimensional model and to publish this captured data. Publishing the data may involve making the data accessible over a network or similar communications system to users of the communication system. The publishing system may make the data available through a range of protocols and systems. For example, the publishing system may make the data available through file transfer protocol (FTP), a web server, advanced program interface (API), or similar protocols and applications.

In one embodiment, a capture device 501 is in communication with a local computer system 513 or similar apparatus that is part of the integrated capture and publishing system. The capture device 501 may be operated by capture application 503. Capture application 503 may be accessible through local user interface 551. The local user interface 551 may be a browser application accessing a published website, a dedicated interface application or similar application. The local user interface 551 may allow a user to control the initiation of a capture to be published and determine the manner and location of the publishing of the data. Capture application 503 may be in communication with publishing module or application 505 via network 511 to provide access to capture functionality including the initiation of a capture and the return of the captured data to a local user and automated exportation of the captured data to the publishing application 505 to be made available as a resource over a communication network.

In one embodiment, captured data, related data and derived data may be embedded in a web page generated by the publishing system and placed on the network to be accessed by users. This web page may be generated from data stored in data records in the database. In one embodiment, the transfer and coordination of data between components of the publishing system may be affected by a transfer module or application 561. The transfer module 561 may be utilized to facilitate automated upload of captured data and other data to the publishing system. Transfer module 561 may facilitate the transfer of data between components such as providing captured data to email application 507. In one embodiment, transfer of data may be session based. In one embodiment, captured data received by the publishing application 505 may be stored in a database 531 in communication with server 521. Data received by the publishing applications may be formatted, parsed, mapped or similarly processed to be prepared for storage in a database. The data may be stored according to an established schema or similar format. Received data may be used to create a database record. The transfer module 561 may be utilized to import the data to the database 531. Data may be received from multiple clients over time to populate the database. Database 531 may be a flat file, relational database, object oriented database or similar database.

In one embodiment, the publishing software may include a server application 509. The server application 509 may make captured data available, i.e. publishes the data over a communication network. In another embodiment, the publishing application 505 and server application 509 may be separate applications. The server application may allow a remote client machine 537 or application to access the captured data which may be resident on the local machine or server 521. The client 537 may communicate with the server application over network 511. The client 537 may be able to access the captured data or the server application 509 and publishing application 505 may allow a client access to the functionality of the capture application 503 to initiate a capture and publish from a location remote from the server.

In one embodiment, email application 507 may be in communication with the publishing application 505 or server application 509. Email application 507 may be utilized by the publishing application 505 or server application 509 to notify a user of the successful receipt of captured data or publishing of captured data. Email application 507 may automatically email uniform resource locator (URL) links or similar links to users of a system or network to indicate the location of published data.

FIG. 5B is a diagram of another embodiment of the integrated capture and publishing system. In this embodiment, the publishing software may be a transaction platform 535. For example, the transaction platform may be an auction website or similar merchant website for facilitating the exchange of goods between buyers and sellers. The transaction platform may include a set of components including a server application 509, auction or transaction module 533, capture application 503, email application 507 and similar software and components. In one embodiment, capture device 501 may be in communication with the transaction platform 535 and controllable by a user of the transaction platform through the capture software 503. Captured data may be stored in a database 531 in communication with the transaction platform. Captured data may be images and models of goods to be sold. Captured data and derived data may be stored as a set of data records. Database 531 may store data utilized by the transaction platform, including data related to products and items offered for sale through the auction module 533. Database 531 may be a flat file, relational database, object oriented database or similar database.

In one embodiment, data generated or stored by the auction module 533 and database may be accessed by remote clients 537, 539, 541 through the server application 509. Server application 509 may be a web server application or similar application. The remote clients may access the data provided by the server application 509 over a distributed network 511 such as a LAN, WAN, e.g., the Internet, or similar communications network.

FIG. 5C is a diagram of a further embodiment of the integrated capture and publishing a system. In the further embodiment, the publishing application may be transaction platform 535. The publishing application may be accessible over a distributed network 511 by a set of remote clients 537, 539. The capture device 501 may be local or in communication with a remote client 539. Capture application 503 may be executed local to the remote machine 539 or local to the capture device 501. In this embodiment, the user of the remote client may access the data provided by the transaction platform 535 through a browser application 551 or similar application.

In one embodiment, a user of the remote client may initiate a capture of an image or representation of an object through a browser or similar display interface. The browser or display interface may utilize a capture application 503 to initiate a capture and return captured data. During or after capture, the captured image or model may be displayed via the browser or interface.

In one embodiment, this data may then be automatically forwarded to the server application on the transaction platform 535. The captured data may be stored at the transaction platform 535 in a database or similar storage structure. The captured data may be associated with transaction data such as information about an item or product to be sold through an auction or sales system. For example, a user of the remote client may be preparing an advertisement for an auction through the auction website provided by the transaction platform. A user may initiate a capture of an image or three dimensional model of an object to be sold and the captured data may be sent automatically to the transaction server to be published. In one embodiment, a reference to the location of an image or model may be passed to the transaction platform 535, e.g., a link to the location. In another embodiment, a transfer module may facilitate the transfer of an image or model to the transaction platform. The published image or three dimensional model may be viewed in connection with other information about the product or item to be sold. The image or model may be viewed via a browser or similar interface to the transaction platform system.

In one embodiment, an email program may be utilized to automatically send captured data to the transaction platform or other destination. The integrated system may automatically generate an email message to the transaction platform and attach captured data. The user may interact with the process to add additional information, approve the sending of the message or similarly guide the process. In one embodiment, the automatically generated email may be a form for selling a product through the transaction platform. The user may fill out the form before sending the email. An email received by the transaction platform may be automatically parsed to identify the captured data to be published and associated data in the electronic mail message.

In another embodiment, an email program, for example Microsoft Outlook may be integrated with the capture application. A user may initiate the capture of an image or model and store the captured data through the email application. The integrated email and capture system may automatically attach captured data to an email message. This message may be sent to any location including to a transaction platform or similar publishing application.

In additional embodiments, launcher applications and conversion applications may be used in conjunction with the integrated capture and publishing system. A launcher application may be present on a server or client to facilitate the launch of individual components of the system or provide a standardized interface for accessing multiple components. A conversion application may be present to convert the captured data from a capture format to a data format native to the other components of the publishing system including the browser application, server application, email system and similar components. Further, details of the integrated capture process are discussed below in relation to FIG. 10.

The preceding embodiments are illustrative examples of the integrated capture and publishing system. Permutations of these exemplary systems may also be used where each component or configuration in one example embodiment may be used with components and configurations of other example embodiments. For example, a launcher program may be used in combination with the example embodiments of FIGS. 5A-5C. Other combinations and variations may be utilized along a spectrum of autonomous coordination between the components and complete integration of the components.

Figure 6:
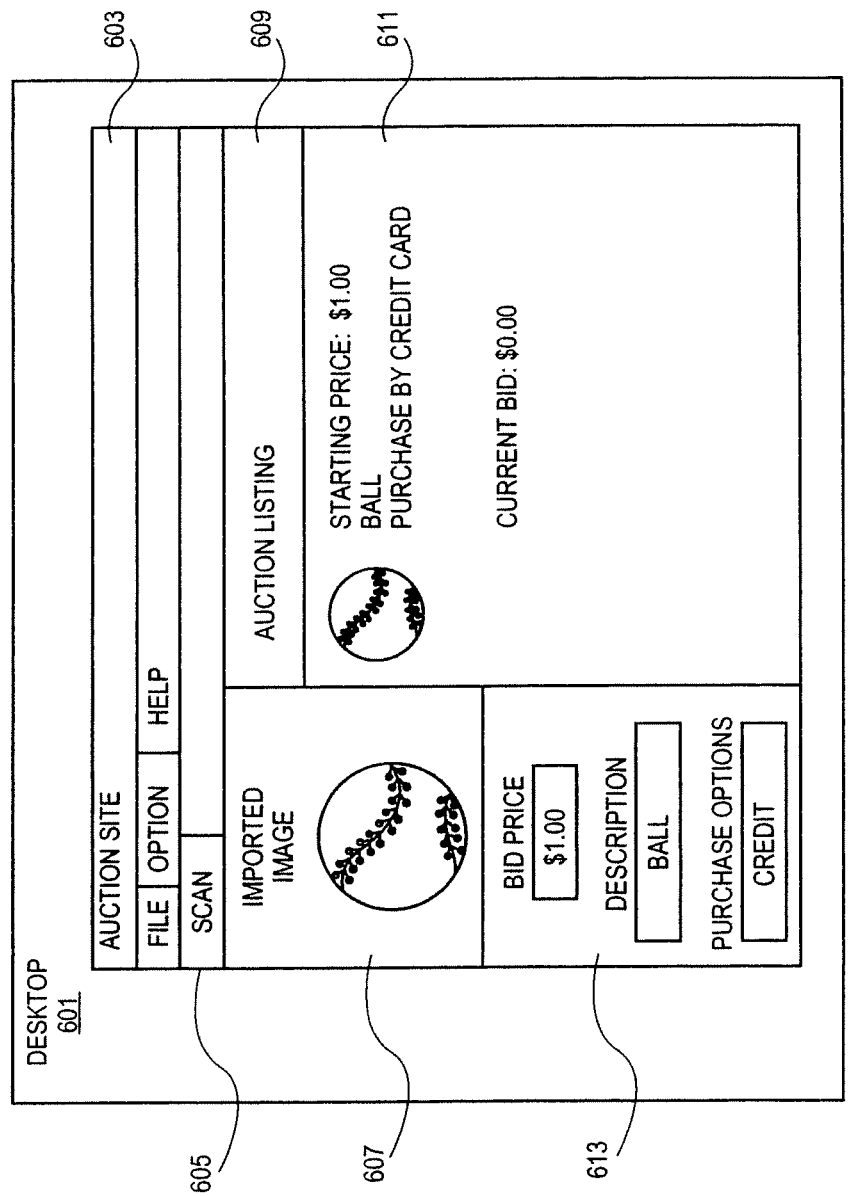
FIG. 6 is a diagram of one embodiment of a user interface of the integrated publishing application.

FIG. 6 is a diagram of one embodiment of a user interface for the integrated publishing and capture system. In one embodiment, the integrated system may be used in the context of a standard operating system environment 601. The operating system may be Microsoft Windows, OS X by Apple Computers or similar operating system environment. The operating system environment may be a windowing environment or similar user interface. In another embodiment, the system may be initiated from a command line interface or similar environment and generate its own graphical user interface.

In one embodiment, the integrated application may function in a discrete window 603 where each of its options, input interface and listing display are available to a user and an interface 605 to the capture application may be present. In one embodiment, the user interface may be a browser application providing access to the published data. For example, the browser may provide access to a website supported by the transaction platform, such as an auction website. In one embodiment, the capture interface 605 may be part of a toolbar, drop down menu or similar interface. The capture interface may provide a user options including initiating a capture, importing data, exporting data and similar options.

In one embodiment, the user interface may provide an input field 613 where a user may input data to be associated with captured data including pricing data, description, purchase options and similar data. The capture interface 605 may be used to input or initiate the input of the captured data. The user interface may include a window 607 or similar display to show the captured data. The user interface may also display other current settings and information related to the captured data such as an example form for an advertisement or auction incorporating the captured data. In another embodiment, a user may view the actual published data through a browsing window 609. The browsing window 609 may be used to display the captured data in the form of an auction listing 611, sale listing or similar published data form. The view of the published data may allow for interaction by providing tools to manipulate the perspective or size of an image or model. The viewer may also provide a space to input a bid and to track the current status of an auction.

In one embodiment, if a capture function is initiated an indicator such as a pop up window or a window of the capture software may be displayed to demonstrate to a user that the capture is in progress or to specify settings for the capture process. The integrated system may also provide an indicator for a conversion process if necessary to allow a user to track the progress of the capture and conversion into a format useable by the search application. In one embodiment, the progress of the capture may be displayed through a window or by a similar mechanism. The display window may display the received image or three dimensional model as it is received or at the time of completion. Further discussion of the integrated capture process are discussed below in relation to FIG. 10.

In other embodiments, any type of user interface including any type of graphical user interface (GUI) may be used to allow a user to access the functionality of the capture application through a browser, publishing application, email application, launcher application or similar program. In another embodiment, the capture application may integrate aspects of the browser, publishing application or email application to facilitate the export of the captured data to the publishing application. The integrated system may be designed to streamline the process of preparing captured data for publishing by automating the process of initiating and controlling a capture process and importing the captured data into the publishing application such that the captured data or data derived from the captured data may be used or be made available over a network or similar communication system.

Figure 7:
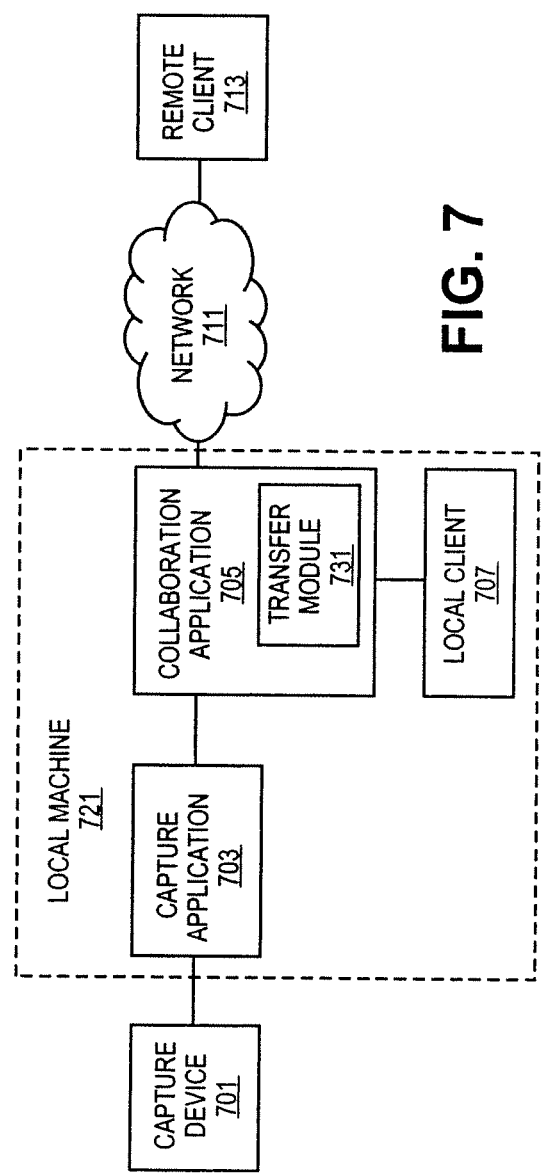
FIG. 7 is a diagram of one embodiment of an integrated system for capturing and sharing a three dimensional representation of an object.

FIG. 7 is a diagram of one embodiment of a collaboration application. A collaboration application 705 may be an application that facilitates communication between users. The users may be at locations mutually remote from one another. The collaboration application 705 may allow users to speak or similarly communicate to one another over a distributed network such as a LAN, WAN, e.g., the Internet, or similar communications network. The collaboration application 705 may support voice communication. The application may also support typed or graphical communication. Users may type messages, draw images or generate three dimensional models of objects. The collaboration program may allow the manipulation of these images and models such that each user may view changes at approximately the same time.

In one embodiment, a capture device 701 may be in communication with capture application 703 on a local machine 721. The capture device 701 may be in communication with capture application 703 through a distributed network connection, USB, FireWire, Bluetooth, or similar communication medium or wireless communication system. Capture application 703 may provide access to capture functionality to a collaboration application 705. The collaboration application 705 may be capable of initiating a capture and receiving the captured data through capture application 703. The collaboration application 705 may be accessed by a local user through a local client 707 or through a direct interface with the collaboration application. The same functionality may be accessed remotely over a network 711 by a user at a remote client 713. In one embodiment, the collaboration application may include a transfer module 731 to manage the movement of the captured data between components. Therefore, transfer module 731 may manage the initialization of other components that are needed for the automated process. In another embodiment, the transfer module 731 may be a separate transfer application. Further, discussions of the integrated capture process are presented below in relation to FIG. 10.

The preceding embodiment is an illustrative example of the integrated capture and collaboration system. Variations of this exemplary embodiment may also be used where each component or configuration in one example may be used with other components and configurations of such as those discussed in relation to other integrated systems. For example, a launcher application may be used in combination with the example embodiment of FIG. 7. In another example, the capture application contains an integrated user interface and functionality necessary for collaboration. Other combinations and variations may be utilized along a spectrum of autonomous coordination between the components and complete integration of the components.

FIG. 8 is a diagram of one embodiment user interface for the integrated collaboration and capture system. In one embodiment, the integrated system may be used in the context of a standard operating system environment 801. The operating system may be Microsoft Windows, OS X by Apple Computers or similar operating system environment. The operating system environment may be a windowing environment or similar user interface. In another embodiment, the system may be initiated from a command line interface or similar environment and generate its own graphical user interface.

In one embodiment, the integrated application may function in a discrete window 803 where each of its options, input interfaces and shared displays are available to a user and an interface 805 to the capture application may be present. In one embodiment, the user interface may be a browser application providing access to the shared data. In another embodiment, the user interface may be a dedicated client application or direct interface to the collaboration application.

In one embodiment, the capture interface 805 may be used to input or initiate the input of the captured data. The user interface may include a window 807 or similar display to show the captured data and other shared data. The user may input data to directly mark up information in the shared window 807. The user may use any type of input device to generate this input. In one embodiment, an image or three dimensional model of an object may be displayed and shared. A set of tools 815 may be present to manipulate the image or three dimensional representation of an object. These tools may facilitate the viewing of the image or representation by allowing rotation, zooming and similar functions.

In one embodiment, a list of users 809 who are currently sharing data in the window or accessing the collaboration program may be provided. In one embodiment a window 811 may be present to show captured data. The captured data may be selected by a user to share with other users of the collaboration application. In one embodiment, if a capture function is initiated, an indicator such as a pop up window or a window of the capture application may be displayed to demonstrate to a user that the capture is in progress or to specify settings for the capture process. The integrated system may also provide an indicator for a conversion process if necessary to allow a user to track the progress of the capture and conversion into a format useable by the collaboration application. In one embodiment, the progress of the capture may be displayed through a window or by a similar mechanism. The display window may display the received image or three dimensional model as it is received or at the time of completion.

In other embodiments, any type of user interface including any type of graphical user interface (GUI) may be used to allow a user to access the functionality of the capture application through the collaboration application or similar program. In another embodiment, the capture application may integrate aspects of the collaboration application to facilitate the export of the captured data to the collaboration application. The integrated system may be designed to streamline the process of preparing captured data for sharing through the collaboration application by automating the process of initiating and controlling a capture process and importing the captured data into the collaboration application such that the captured data or data derived from the captured data may be used or be made available to share over a network or similar communication system.

FIG. 9 is a diagram of one embodiment of a reproduction application. A reproduction application may be an application that facilitates the reproduction of an object by copying or faxing the captured object data to a reproduction apparatus. In one embodiment, the captured object data may be sent to a manufacturing device. The manufacturing device may be a polymer, plastic, resin or similar material, molding, layering or similar automated manufacturing device. The user may be at a location remote from the manufacturing device.

In one embodiment, a capture device 901 may be in communication with capture application 903 on a system 921. The capture device may be in communication with capture application 903 through a distributed network connection, USB, FireWire, Bluetooth, or similar communication medium or wireless communication system. Capture application 903 may provide access to capture functionality to a fabrication or reproduction module 905. The reproduction module 905 may be capable of initiating a capture and receiving the captured data through capture application 903. The reproduction module 905 may manage input captured data and prepare the captured data for output according to the type of device the reproduction module 905 manages. The reproduction unit may analyze the data to determine the constituent materials and dimensions of the object. The reproduction module 905 may then generate a schematic or set of instructions for reproducing the object according to the capabilities of the reproduction apparatus 907 that the reproduction module governs. In one embodiment, the reproduction module 905 may include a transfer module 931 to manage the movement of the captured data between components. Transfer module 931 may be capable of communicating with other components via a distributed network or similar communications system. Transfer module 931 may manage the initialization of other components that are needed for the automated process. In another embodiment, the transfer module 931 may be a separate transfer application.

In one embodiment, the reproduction apparatus may be a plastic or similar material 'printer' capable of laying out successive layers or similarly assembling materials that bond to one another in successive patterns to generate a three dimensional reproduction of the captured object.

The preceding embodiment is an illustrative example of the integrated capture and reproduction system. Variations of this exemplary system may also be used where each component or configuration in one embodiment may be used with other components and configurations of other systems such as those discussed in relation to other integrated systems. For example, a launcher program may be used in combination with the example embodiment of FIG. 9. Components may also be present on separate computer systems in a distributed implementation or combined on the same system. Other combinations and variations may be utilized along a spectrum of autonomous coordination between the components and complete integration of the components.

Figure 10:
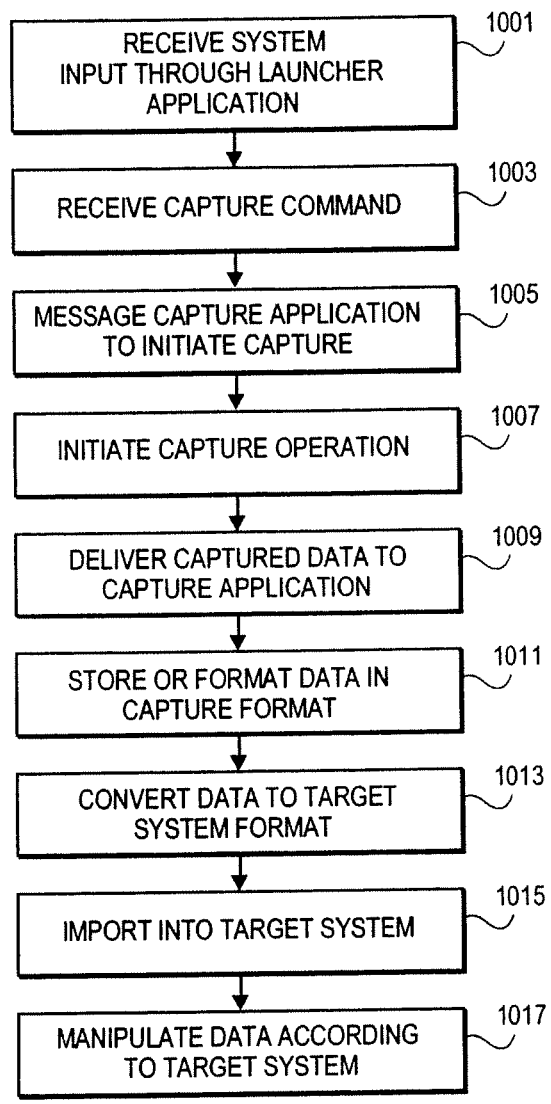
FIG. 10 is a flowchart of one embodiment of a process for handling a capture request in an integrated application environment.

FIG. 10 is a flow chart of one embodiment of an automated capture and data import process application to each of the embodiments described above. This process may be applicable to any embodiment or integrated application ("target applications"). In one embodiment, a system initialization input may be received from a user (block 1001). For example, a user may execute a launcher program that initiates each of the components of the integrated capture system including the capture application, conversion application, target application and similar components. In another embodiment, each component may be initialized or executed separately by a user or the initialization or usage of one application may automatically initialize the other needed applications.

In one embodiment, a user of the target applications may input a capture command (block 1003). The capture command may be supported by integrated functionality that communicates directly with a capture device or that communicates with an independent capture application that initiates a capture (block 1007). In one embodiment, the capture device returns data to the process that initiated it, either a capture application or target application (block 1009). The data may then be stored in a format native to the capture application or receiving application (block 1011). In one embodiment, the captured data may be transferred from the capture application to a conversion application or the target application. The transfer of the captured data may be affected by designation, the captured data as a shared file, placing the data in a stored memory space, transferring through network protocols or OS based protocols, e.g., a socket and similar transfer methods. In one embodiment, the data may be stored in multiple locations in multiple formats, and may be synchronized between accessing applications. In one embodiment, captured data may be stored in a database. A transfer module, capture application, target application or similar component may map the captured data, related data and received data into the database based on designated relationships between the captured data and database schemas. The user may select a mapping, schema or similar settings. A conversion application may be initiated by the target application, capture application or similar application to convert the captured data into a format native to the target application (block 1013). In another embodiment, the data may be initially stored in a format native to the target application and the conversion application may not be utilized.

In one embodiment, after the captured data has been stored in a format native to the target application, it may be imported into the application by an open file command, import command or similar command (block 1015). The imported data may be viewed, altered, and stored as data generated by the target application after importation.

In one embodiment, the integrated capture systems may be implemented in software and stored or transmitted in a machine-readable medium. As used herein, a machine-readable medium is a medium that can store or transmit data such as a fixed disk, physical disk, optical disk, CDROM, DVD, floppy disk, magnetic disk, wireless device, infrared device, and similar storage and transmission technologies.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
   a capture module to drive a capture unit to capture three-dimensional (3D) data about a physical object;
   an analysis module to automatically derive characteristics from the 3D data;
   a search module that uses the characteristics to find data relating to captured 3D data by searching information outside the captured 3D data; and
   wherein the capture module, analysis module and search module are integrated to allow substantially automated transfer of information derived from the 3D data to the search module.

2. The system of claim 1 wherein the subject of a search is substantially specified by the transferred information.

3. The system of claim 1 coupled to a distributed network wherein at least some of the information searched by the search module is accessible over the distributed network.

4. A system comprising:
   a capture module to drive a capture unit to capture three-dimensional (3D) data about a physical object;
   an analysis module to automatically derive characteristics from the 3D data;
   a database to contain characteristics derived from the 3D data; and
   wherein the capture module, analysis module, and database are integrated to allow substantially automated population of the database with the information.

5. The system of claim 4 coupled to a distributed network wherein at least one data record in the database is accessible via the distributed network.

6. The system of claim 4 further comprising a module that substantially automatically generates a web page incorporating data from at least one data record in the database.

7. A system comprising:
   a capture module to drive a capture unit to capture three-dimensional (3D) data about a physical object;

an analysis module to automatically derive characteristics from the 3D data;

a publishing module to enable access over a distributed network to information derived from the 3D data and the characteristics; and wherein the capture module, analysis module and publishing module are integrated to allow substantially automated publishing of information derived from the 3D data from the capture module.

8. The system of claim 7 wherein the capture unit further captures an image of a surface of the physical object.

9. The system of claim 7 wherein information derived from the 3D data is published to a web page.

10. The system of claim 7 wherein information derived from the 3D data is published to a database.

11. The system of claim 10 wherein the database is coupled to a process capable of creating a web page containing the derived information.

12. The system of claim 7 wherein the publishing module transfers to an email module a reference to a resource on a distributed network, which location contains information derived from the 3D data.

13. A system comprising:

a capture module to drive a capture unit to capture three-dimensional (3D) data about a physical object;

an analysis module to automatically derive characteristics from the 3D data;

a search module that uses the characteristics to search a distributed network for data relating to the captured 3D data;

wherein the capture module and search module are integrated to allow substantially automated transfer of information derived from the 3D data to the search module.

14. The system of claim 13 wherein the distributed network is the Internet.

15. The system of claim 2 wherein the specification is generated automatically responsive to the transferred information.

* * * * *